Figure 1:
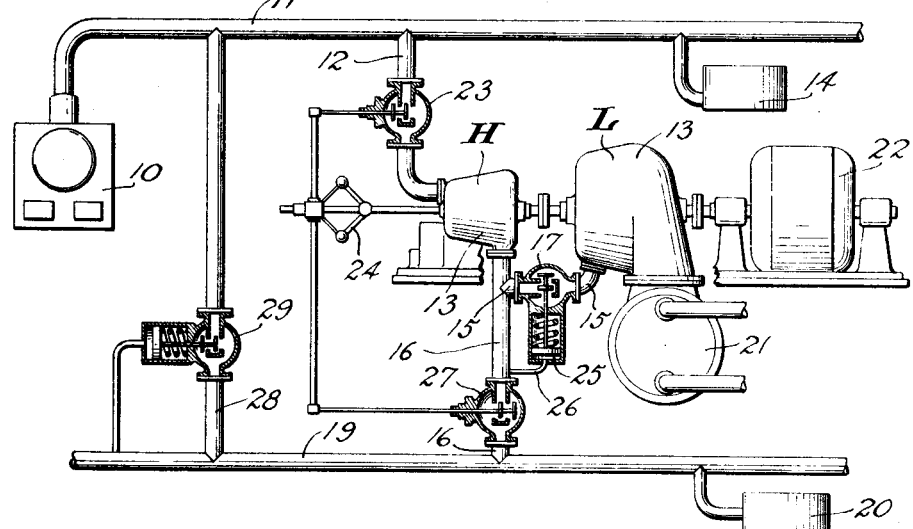

Sept. 3, 1929.   M. BÄCKSTRÖM ET AL   1,726,730
STEAM POWER PLANT
Filed Nov. 7, 1927

INVENTORS
Matts Bäckström
Carl Fihl
BY
Wm. J. Hedlund
ATTORNEY

Patented Sept. 3, 1929.

1,726,730

UNITED STATES PATENT OFFICE.

MATTS BÄCKSTRÖM AND CARL FÖHL, OF STOCKHOLM, SWEDEN, ASSIGNORS TO RUTHS ACCUMULATOR AKTIEBOLAG, OF STOCKHOLM, SWEDEN, A CORPORATION OF SWEDEN.

STEAM-POWER PLANT.

Application filed November 7, 1927, Serial No. 231,515, and in Germany November 29, 1926.

The invention relates to steam plants and has for its object to increase efficiency and capacity. In one form the invention overcomes certain disadvantages in existing steam plants by a very simple expedient. It consists in a new combination of steam plant equipment with a turbine or other power producing mechanism whereby the power producing mechanism may be made capable of delivering its maximum power output without being affected by factors of demand and supply of steam in other parts of the plant, particularly low pressure consumers connected to receive steam from the power producing mechanism.

Condensing turbines (and when turbines are mentioned, it will be understood that the same language applies to other prime movers) from which steam is bled to low pressure consumers are usually governed in one of two ways. Either the last, the condensing, section is governed by a speed responsive regulator and the higher pressure section ahead of the bleed line by a pressure regulator responsive to pressure in the bleed line; or the condensing section by a pressure regulator responsive to pressure in the bleed line and the higher pressure section by a speed regulator. The first arrangement is much to be preferred in view of a disadvantage in the second which will be pointed out. In either case it is desirable and usually necessary to have a steam line adapted to supply steam to the low pressure consumers in parallel to the turbine with a reducing valve in the same.

The disadvantage of the second type is this. Assume that the load on the turbine of the second type plant is low but that the low pressure consumers require a great deal of steam. The pressure responsive valve closes off the supply of steam to the low pressure turbine section due to drop of pressure in the bleed line. The turbine then operates as a non-condensing turbine controlled only by speed. Assuming the demand to be greater than what is supplied by the turbine, the remainder is supplied to the parallel pipe line through the reducing valve. Now suppose that the power demand increases. The speed regulator opens the high pressure section wide but, with a heavy demand for low pressure steam, the pressure valve will not open because the bleed line pressure at which it opens due to the demand and the pressure is determined by the adjustment of the reducing valve in the parallel supply line. It is therefore sometimes desirable to transform the second type of control arrangement into one of the first type. To replace the valves and their controls is expensive. The problem is solved in a simpler, non-expensive manner.

The solution is this: A valve responsive to speed of the turbine is placed in the bleed line through which flows the steam to the low pressure consumers but not the steam to the low pressure turbine section. The rest of the regulation remains as it was. When the speed regulator controlling flow to the higher pressure turbine section has opened completely and the engine has slowed up some, this bleed line speed responsive valve is operated so as to close the bleed line. This causes a rise of pressure in the bleed line ahead of the valve which opens the pressure regulator so that the condensing section of the turbine is made effective. Thus the disadvantage is overcome by simply adding a new speed regulator controlling a valve in the bleed line as a result of which the second type operates like the first type.

Figure 2:
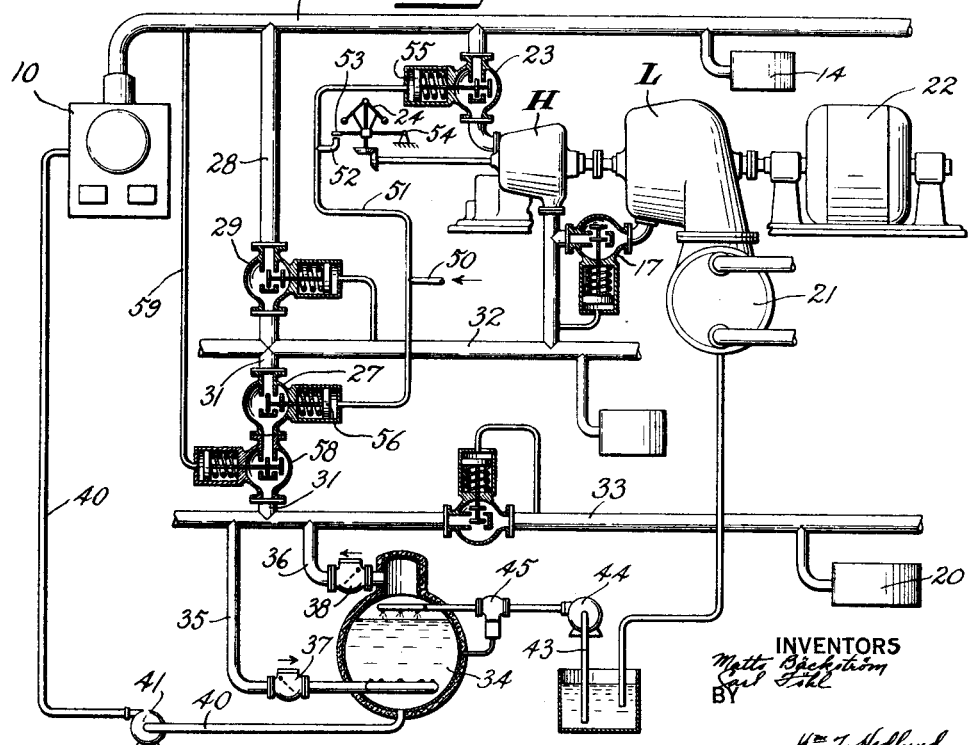

On the accompanying drawings are shown two turbine plants employing the invention, one with and one without an accumulator:

Fig. 1 shows the plant without an accumulator; and Fig. 2 shows the plant with the accumulator.

Referring more particularly to Fig. 1, reference character 10 designates the boiler or boilers supplying steam through main conduit 11 and turbine supply conduit 12 to turbine 13. Consumers 14 may also be supplied by conduit 11.

Turbine 13 is a multi-stage turbine having a high pressure section H and a low pressure section L. Reference character 15 designates a connection between high pressure turbine section H and low pressure section L. Bleed conduit 16 bleeds steam from the turbine between section H and section L. For purposes of illustration, bleed line 16 is shown as connected to connection 15 ahead of over-flow valve 17 which directly controls flow to the condensing section of the turbine. Bleed line 16 is connected to low pressure conduit 19 which supplies steam to one or more consumers indicated by reference character 20. The turbine 13 has a condenser 21 and is shown as driving an electric generator 22.

Flow through turbine supply line 12 is controlled by a valve 23 which is connected to a speed regulator 24 responsive to the speed of the turbine. The arrangement is such that when the speed increases, valve 23 is closed to a greater or less extent. Valve 17 is shown as operated by a piston 25 connected in a suitable manner to be operated by pressure in bleed line 16. For purposes of illustration a tube 26 is shown connecting bleed line 16 with one side of piston 25. The arrangement is such that an increase of pressure in the bleed line causes a corresponding opening of valve 17. Valves 17 and 23 constitute the previously known regulation for a turbine of the second type as above outlined.

Considering the apparatus so far described, without considering the valve designated by reference character 27, assume that the demand for steam in the low pressure line 19 decreases. This causes a rise of pressure against piston 25 and causes valve 17 to open, thus increasing the supply of steam to the condensing section L. This increases the speed of the turbine and speed regulator 24 causes a closing of valve 23 which decreases the supply of steam to the turbine and thus the pressure returns to normal.

A conduit 28 is provided parallel to the turbine and connecting conduit 11 with conduit 19 in which is a reducing valve 29 which may be of any known type, operating to permit passage of steam through conduit 28 upon decrease of pressure in conduit 19 below a predetermined value.

Now assume that the demand for low pressure steam is great. The pressure drops in conduit 19 and in bleed line 16, wherefore valve 17 closes. Valve 23 then opens to supply the required steam. Assume that this is not enough. Valve 29 then opens and admits steam through conduit 28 to the low pressure conduit to supply the required amount. Now suppose that the turbine load increases. The valve 23 opens wide due to decrease of speed of the turbine and actuation by speed regulator 24. Suppose, now, that the low pressure consumers 20 are drawing so much steam that the pressure does not rise sufficiently in bleed line 16 to open valve 17. The turbine thus cannot be supplied with enough steam. But the steam which should be supplied through the turbine passes through conduit 28.

Valve 27 avoids this difficulty. The speed regulator is connected to valve 27 in such a manner that just after the speed decreases to the point where valve 23 is wide open, valve 27 begins to close, whereby the steam pressure in bleed line 16 ahead of valve 27 rises and this causes an opening of valve 17 whereby the turbine is permitted to utilize its condensing section and to give out the necessary power.

While the speed regulator is shown as diagrammatically connected to both valves, it will be readily understood that various types of speed regulators may be used and that it would be preferable in reconstructing an existant plant to add a speed regulator without disturbing the previous regulation of the turbine, which new speed regulator might be operated in any of various known ways.

In Fig. 2 is shown a similar arrangement differing only in that the speed regulator control valve 27 is placed in a conduit 31 connected between an intermediate pressure conduit 32 receiving bleed steam from the turbine and a low pressure conduit 33 to which an accumulator 34 is connected in parallel by means of conduits 35 and 36 containing check valves 37 and 38 respectively permitting flow of steam in the direction indicated by the arrows. The accumulator is shown as a hot water accumulator supplying hot water to the boilers through conduit 40 and pump 41. Cold water is supplied to the accumulator through conduit 43 and pump 44, the supply being controlled by the pressure in the accumulator acting on valve 45 so as to maintain a constant temperature and pressure in the accumulator.

Again, when valve 17 is closed and valve 23 is wide open, and the turbine needs more steam, valve 27 is actuated by the drop in speed to close, partly or wholly, connection 31 and cause a rise of the bleed pressure of the turbine whereby the overflow valve 17 to the condensing section may be opened.

In Fig. 2 the regulation is of the fluid pressure type. Reference character 50 designates a source of pressure fluid such as oil. The oil flows through conduits 51 and 52. Oil issues from the end of conduit 52 and the amount of oil flowing out is controlled by a baffle member 53 which swings about a pivot 54 and is moved to and away from the oil opening by speed regulator 24. Conduit 51 is connected to pistons 55 and 56 which operate valves 23 and 27 respectively. The pressure of oil against the pistons is indicated as being suitably balanced by springs. The springs or other means of regulation should be adjusted to give the desired function.

Assume that the speed decreases while valve 17 is closed. The speed governor 24 causes baffle member 53 to throttle the oil discharge from conduit 52, thus raising the pressure of the fluid in conduit 51, thus increasing the pressure against piston 55 which causes an opening of valve 23. When the fluid pressure has risen so high, due to decrease of speed that valve 23 is wide open, then piston 56 is moved so as to close valve 27. This raises the pressure in conduit 32 and causes an opening of valve 17.

An overflow valve 58 is situated in conduit 31 and is operated through tube 59 by the pressure in conduit 11. When the pressure in conduit 11 rises, the overflow valve 58 is opened and permits flow of steam to the accumulator whereby the pressure in conduit 11 is brought back to normal in a manner which will be readily understood from the description of the structural parts of the plant.

While several embodiments of the invention have been described, it will be evident that further embodiments will be possible within the scope of the invention.

In the accompanying claims, high pressure and low pressure are relative terms which designate two sections of a prime mover or the like, one section operating under higher pressure than the other.

We claim:

1. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, means responsive to pressure in said bleed conduit for controlling flow through said connection, speed responsive means to control flow through said supply conduit and means responsive to motor conditions during normal operation to control flow through the bleed conduit.

2. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, a valve responsive to pressure in said bleed conduit for controlling flow through said connection, speed responsive means to control flow through said supply conduit, means responsive to speed of the motor to diminish steam flow through the bleed conduit to cause a rise of pressure for opening the valve in the said connection.

3. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, means responsive to pressure in said bleed conduit for controlling flow through said connection, speed responsive means to control flow through said supply conduit and a valve in said bleed conduit operated to close when the speed of the motor falls below a value at which the speed responsive means controlling said supply conduit permits full flow therethrough.

4. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, a valve in said supply conduit, a speed responsive regulator responsive to speed of the motor to open said valve on decrease of speed below a predetermined value, a valve in said connection, pressure responsive means resposive to pressure in said bleed conduit to open the last mentioned valve on increase of pressure, a valve in said bleed conduit and speed responsive means responisve to the speed of said motor to close the last mentioned valve when the first mentioned valve is wide open, the pressure for controlling the valve in said connection being taken from a point in said bleed conduit ahead of the speed responsive valve therein.

5. A steam plant comprising, in combination, a source of steam, a motor having a high pressure section and a low pressure section, an accumulator, a consumer, a supply conduit connecting said motor with said source of steam, a connection for conducting steam from the high pressure section to the low pressure section, a bleed conduit for conducting steam from the high pressure section to the accumulator, means to utilize the stored contents of the accumulator, means responsive to pressure in said bleed conduit for controlling flow through said connection, speed responsive means to control flow through said supply conduit, means dependent on motor conditions to diminish steam flow through the bleed conduit to cause a rise of pressure for increasing flow of steam through said connection and means responsive to pressure in said source for controlling the supply of steam to the accumulator.

6. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, means responsive to pressure in said bleed conduit to control flow through said connection, speed responsive means to control flow through said supply conduit, and means responsive to motor conditions controlling flow through the bleed conduit to regulate the pressure therein.

7. A steam plant comprising, in combination, a source of steam, a motor having a high pressure section and a low pressure section, a consumer, a supply conduit connecting said motor with said source of steam, a connection for conducting steam from the high pressure section to the low pressure section, a bleed conduit for conducting steam from the high pressure section to the consumer, means responsive to pressure in said bleed conduit for controlling flow through said connection and speed responsive means for varying flow of steam through said bleed conduit to said consumer.

In testimony whereof we hereunto affix our signatures.

MATTS BÄCKSTRÖM.
CARL FÖHL.